(12) United States Patent
Jeng et al.

(10) Patent No.: US 9,862,147 B2
(45) Date of Patent: Jan. 9, 2018

(54) METHOD OF STEREOLITHOGRAPHY FABRICATION AND PHOTO-CURING PHOTOSENSITIVE RESIN

(71) Applicant: National Taiwan University of Science and Technology, Taipei (TW)

(72) Inventors: Jeng-Ywan Jeng, Taipei (TW); Rimma Shafikova, Taipei (TW); Wei-Nien Su, Taipei (TW); Bing-Joe Hwang, Taipei (TW)

(73) Assignee: NATIONAL TAIWAN UNIVERSITY OF SCIENCE AND TECHNOLOGY, Taipei (TW)

( * ) Notice: Subject to any disclaimer, the term of this patent is extended or adjusted under 35 U.S.C. 154(b) by 237 days.

(21) Appl. No.: 14/991,541

(22) Filed: Jan. 8, 2016

(65) Prior Publication Data

US 2016/0200042 A1    Jul. 14, 2016

(30) Foreign Application Priority Data

Jan. 12, 2015  (TW) .............................. 104100963 A (51) Int. Cl.
*G05B 19/4099* (2006.01)
*G06F 17/50* (2006.01)
(Continued)

(52) U.S. Cl.
CPC .......... *B29C 67/007* (2013.01); *B29C 64/124* (2017.08); *B29C 64/129* (2017.08);
(Continued)

(58) Field of Classification Search
CPC ... B29C 64/124; B29C 64/129; B29C 64/135; B29C 64/264; B29C 64/277;
(Continued)

(56) References Cited

U.S. PATENT DOCUMENTS

2012/0224755 A1* 9/2012 Wu .................... G06T 17/00
382/131
2014/0379119 A1* 12/2014 Sciacchitano ...... G05B 19/4099
700/182

(Continued)

FOREIGN PATENT DOCUMENTS

CN      101063812 A     10/2007

OTHER PUBLICATIONS

Office Action issued for Taiwan Patent Application No. 104100963 dated Feb. 24, 2016 and English translation of search report.

*Primary Examiner* — Leo B Tentoni
(74) *Attorney, Agent, or Firm* — Haynes & Boone, LLP (57) ABSTRACT

A method of photo-curing a photo-sensitive resin is disclosed in the present invention. The method includes the following steps: generating a sub-pixel pattern having an outer contour region and an inner contour region based on a vector file taken from a cross-section of a model; providing the sub-pixel pattern to a photomask module, wherein the photomask module includes a panel having a pixel matrix including plural square pixels, each of which includes three color-filtered sub-pixels; flood-filling color in each of the color-filtered sub-pixels to distinguish the outer contour region from the inner contour region; and exposing the photo-sensitive resin to a light source emitting a light passing through the panel.

20 Claims, 5 Drawing Sheets

(51) Int. Cl.
| | |
|---|---|
| G06T 17/00 | (2006.01) |
| G06T 19/00 | (2011.01) |
| B29C 67/00 | (2017.01) |
| B33Y 10/00 | (2015.01) |
| B33Y 50/00 | (2015.01) |
| B29C 64/386 | (2017.01) |
| B29C 64/124 | (2017.01) |
| B29C 64/277 | (2017.01) |
| B33Y 50/02 | (2015.01) |
| B29C 64/264 | (2017.01) |
| B29C 64/282 | (2017.01) |
| B29C 64/286 | (2017.01) |
| B29C 64/135 | (2017.01) |
| B29C 64/393 | (2017.01) |
| B29C 64/129 | (2017.01) |

(52) U.S. Cl.
CPC .......... *B29C 64/135* (2017.08); *B29C 64/264* (2017.08); *B29C 64/277* (2017.08); *B29C 64/282* (2017.08); *B29C 64/286* (2017.08); *B29C 64/386* (2017.08); *B29C 64/393* (2017.08); *B33Y 10/00* (2014.12); *B33Y 50/00* (2014.12); *B33Y 50/02* (2014.12)

(58) Field of Classification Search
CPC ... B29C 64/282; B29C 64/286; B29C 64/386; B29C 64/393; B29C 67/0062; B29C 67/0066; B29C 67/007; B29C 67/0088; B33Y 10/00; B33Y 50/00; B33Y 50/02; G05B 19/4099; G06F 17/50; G06T 17/00; G06T 19/00
USPC .......................................... 264/401; 700/120
See application file for complete search history.

(56) References Cited

U.S. PATENT DOCUMENTS

2015/0025666 A1* 1/2015 Olivieri .................. G06F 17/50
 700/98
2015/0137426 A1* 5/2015 Van Esbroeck ........ B33Y 10/00
 264/401

* cited by examiner

METHOD OF STEREOLITHOGRAPHY FABRICATION AND PHOTO-CURING PHOTOSENSITIVE RESIN

CROSS-REFERENCE TO RELATED APPLICATION AND CLAIM OF PRIORITY

This application claims the benefit of Taiwan Patent Application No. 104100963, filed on Jan. 12, 2015, at the Taiwan Intellectual Property Office, the disclosure of which is incorporated herein in its entirety by reference.

FIELD OF THE INVENTION

The present invention is related to a method of stereolithography fabrication. In particular, the present invention is related to a method of photo-curing a resin using stereolithography fabrication.

BACKGROUND OF THE INVENTION

Vat Polymerization is a method in 3D printing to print 3D objects using photo-polymerization. Technically, Vat Polymerization produces an array using additive manufacturing (AM) processes for which a liquid resin contained in a vat is selectively solidified via light-activated polymerization (also called light-cured polymerization). Vat Polymerization Processes (VPP) allow a high accuracy-for-speed ratio and superior surface finishing, require neither high-powered lasers nor an inert gas building chamber, as in case of powder-based AM technologies. Applications of VPP include rapid prototyping for product design evaluation, indirect tooling for dies and molds such as tooling for jewelry or dental implants and direct digital manufacturing for niche markets or personalized medical devices such as dental aligners or hearing aids.

Currently available commercial VPP systems utilize either laser beam(s) for vector-by-vector scanning or digital light processing (DLP) projectors for blanket exposure and hardening of an entire layer. For the latter approach throughput and speed can be higher than for the former approach because building speed is independent because of the object geometry in the XY horizontal plane. It also eliminates the need for XY linear motion or scanning mirrors, leaving the need to only consider the mechanical elements along the Z axis in the system.

A thin-film transistor LCD (TFT-LCD) panel is an alternative to DLP projectors for a dynamic formation of photomask which can be projected on the resin surface. The price for a DLP development kit from commercial vendors is extremely high while the price of a high-resolution LCD panel is less than half of this, which is clearly more cost-effective. Screen pixel in a modern TFT-LCD mobile device have been reduced to 49 μm×49 μmm in size, and will continue to shrink as the semiconductor industry advances.

This may still appear inferior in comparison to DLP projection, where the light beam is split into separate pixels by millions of mirrors as small as 13.7 μmm×13.7 μmm. However, light reflected from micromirrors diverge, and pixels expand with increasing focus distance. Thus, square pixels become discernible under close inspection of a presentation screen. Liquid crystal displays, in contrast, have uniform pixel size over the entire area and accuracy characteristics are independent of scale. However, none of the prior studies has tried to benefit from specific liquid crystal display properties, such as the red-green-blue sub-components of a pixel.

In order to overcome the drawbacks in the prior art, the present invention introduces a novel low-cost software-based method of resolution and accuracy enhancement for the LCD type Vat Polymerization process. The particular design in the present invention not only solves the aforementioned problems, but is also easy to implement. Thus, the present invention has utility for the industry.

SUMMARY OF THE INVENTION

A novel cost-effective method of resolution and accuracy enhancement for LCD type Vat Polymerization processes is disclosed. As a result of the present invention, cross-sectional patterns are generated with smoother edges and at a higher resolution.

In accordance with one aspect of the present invention, a method of photo-curing a photo-sensitive resin is disclosed. The method includes the following steps: generating a sub-pixel pattern having an outer contour region and an inner contour region based on a vector file taken from a cross-section of a model; providing the sub-pixel pattern to a photomask module, wherein the photomask module includes a panel having a pixel matrix including plural square pixels, each of which includes three color-filtered sub-pixels; flood-filling color for each of the color-filtered sub-pixels to distinguish the outer contour region from the inner contour region; and exposing the photo-sensitive resin to a light source emitting a light passing through the panel.

In accordance with another aspect of the present invention, a stereolithography method for fabricating an article based on a cross-section of a model is disclosed, comprising steps of: (a) providing a liquid crystal display photomask module (LCDLMM) having a pixel matrix including plural square pixels, each of which includes three addressable sub-pixels; (b) inputting a contour, simulating the cross-section, into the LCDLMM; (c) determining all the addressable sub-pixels inside the contour; (d) flood-filling color for each of the addressable sub-pixels inside the contour; and (e) forming the article based on the pixel matrix.

In accordance with a further aspect of the present invention, a stereolithography method for fabricating a layer based on a cross-section of a candidate object is disclosed, comprising the steps of: (a) providing a transparent mask module having a sub-pixel matrix including plural addressable sub-pixels elements; (b) designing a contour, simulating the cross-section, into the sub-pixel matrix; (c) checking one by one whether each of the plural sub-pixels elements is located inside the contour; (d) flood-filling color for each of the sub-pixels inside the contour; and (f) forming the layer based on the sub-pixel matrix.

The objects and advantages of the present invention will become more readily apparent to those ordinarily skilled in the art after reviewing the following detailed descriptions and accompanying drawings, in which:

DETAILED DESCRIPTION OF THE PREFERRED EMBODIMENT

The present invention will now be described more specifically with reference to the following embodiments. It is to be noted that the following descriptions of the preferred embodiments of this invention are presented herein for the purposes of illustration and description only; they are not intended to be exhaustive or to be limited to the precise form disclosed.

Figure 1:
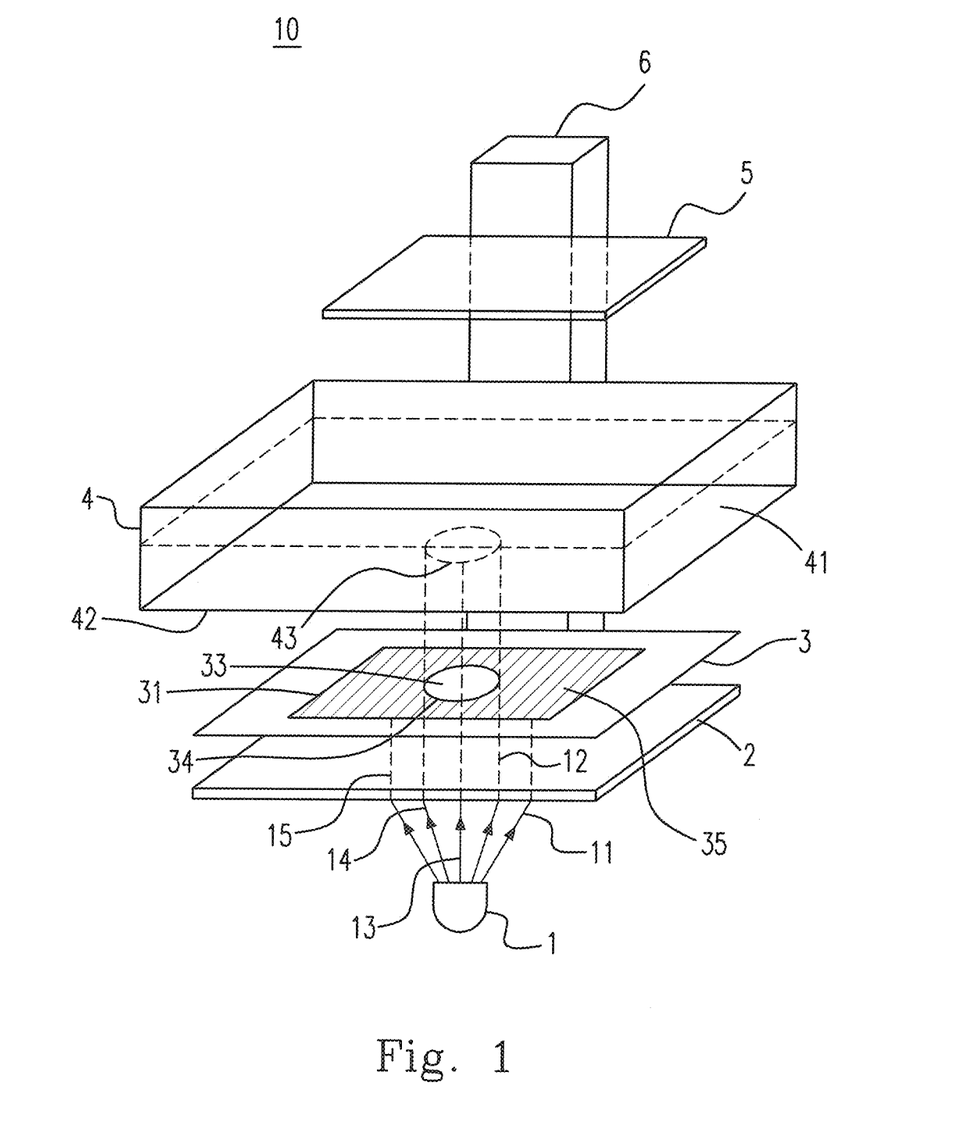
FIG. 1 shows the hardware setup according to an embodiment of the present invention.

Please refer to FIG. 1, which is a schematic diagram showing the hardware setup according to one embodiment of the present invention. According to FIG. 1, a VPP system 10 comprises a light source 1, a photomask module 3 having an LCD panel 31, a resin vat 4 containing photosensitive resin 41, a modeling platform 5 and an elevator 6. Depending on the type of photosensitive resin 41 that is used, the light source 1 can be a point light source, a linear light source, a planar light source or a combination thereof. In one particular embodiment, the light source 1 is a halogen lamp which is more cost-effective than the other options. The light source 1 is configured to emit lights 11-15. Notably, a lens module 2 can be placed between the light source 1 and the LCD panel 31 to focus the lights 11-15 according to one embodiment. Some of the lights such as lights 12-14 pass the lens module 2, the LCD panel 31, and all the way through the resin vat 4, which is preferably transparent at least at the bottom 42. In one embodiment, the lights 12-14 are used to solidify the photosensitive resin 41 near the bottom layer to complete the vat polymerization process (VPP).

Figure 2:
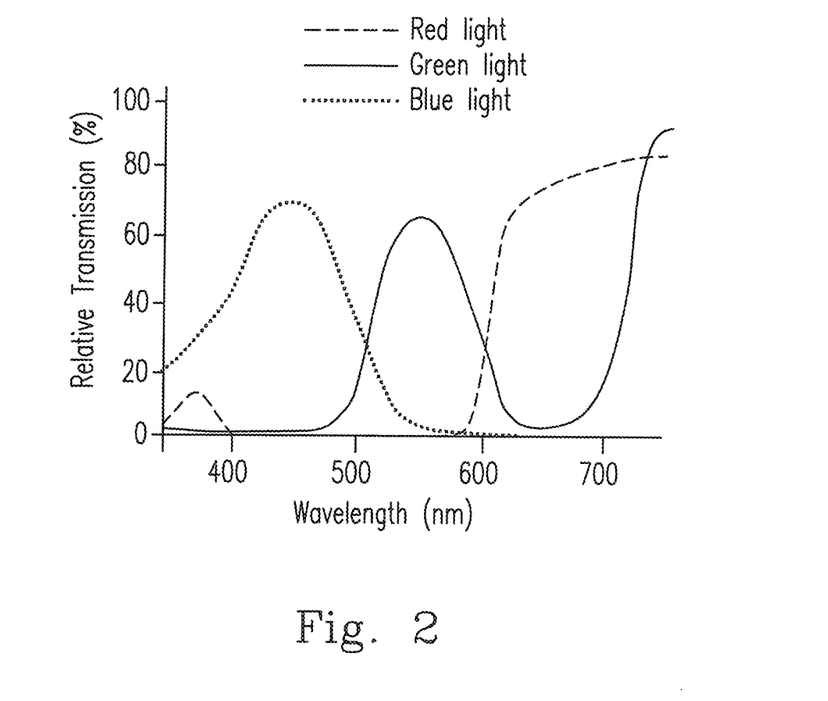
FIG. 2 shows the transmission spectrums of typical thin film color filters.
Figure 3:
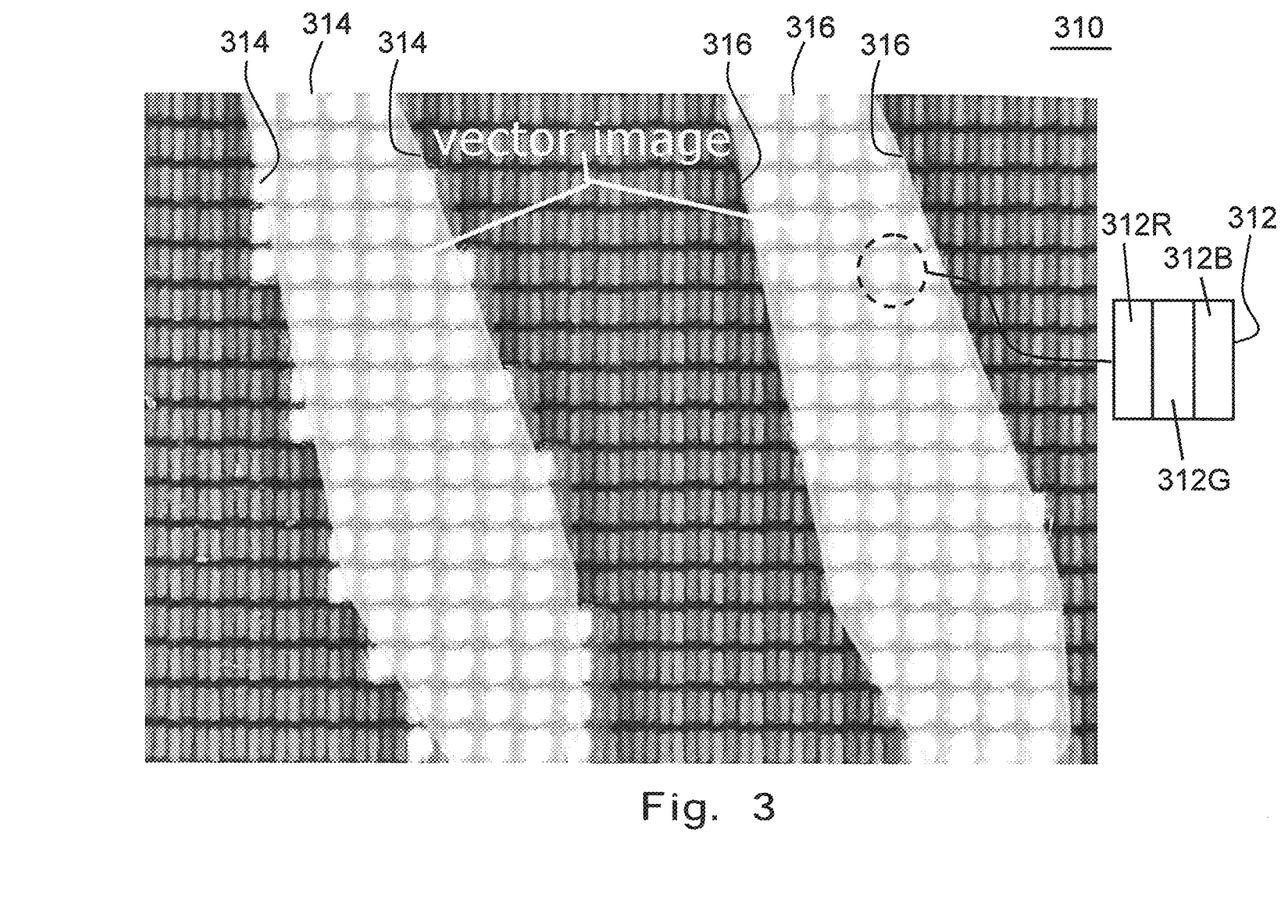
FIG. 3 shows a microphotograph of a pattern generated on a display with superimposed vector reference images.

The LCD panel 31 in the embodiment of the present invention is utilized as a tool to determine the profile of each layer to be fabricated using the VPP method. FIG. 2 shows the transmission spectrum of typical thin film color filters, which have transmission spectrums of 400-520 nm for blue, 480-600 nm for green, and 580 nm and up for red. To employ the LCD panel 31 such as a TFT LCD panel according to one embodiment of the present invention, the photosensitive resin 41 preferably has an absorption spectrum in the visible light region, which covers the spectrum regions of red, green and blue light, so the photosensitive resin 41 can be solidified by visible light including white, red, green and blue light. Referring to FIG. 3, the LCD panel 31 comprises a pixel matrix 310 including plural square pixels 312, each of which includes three color-filtered sub-pixels 312R, 312G, 312B showing red, green and blue colors respectively when switched on. The skilled person in the art can appreciate that the relative position of the three sub-pixels inside a pixel can be arranged in an order different from the example as illustrated in FIG. 3, which is for the purpose of demonstration. According to one embodiment of the present invention, each of the sub-pixels 312R, 312G, 312B can be addressable so as to be individually controlled by the photomask module 3. In theory, the area of each of the sub-pixels is one third of that of a full pixel. Therefore, the resolution of a sub-pixel pattern according to the present invention should be 3-times that of a traditional full-pixel pattern.

The photomask module 3 can be electronically controlled to change the pattern shown by the LCD panel 31 when a new layer of resin is to be fabricated. The pattern on the LCD panel 31 originates from a vector file such as the example shown in FIG. 4(A). This particular example complies with the Hewlett-Packard Graphical Language (HPGL) while some other languages may also be useful for creating a vector file. In one embodiment, the vector file is taken from a cross-section of a model (not shown), which can be a life-size candidate object. Alternatively, the vector file can be designed based on a three-dimensional computer-assisted-design (CAD) model by a designer. In this case, the three-dimensional CAD model is converted into a data file such as a tessellated STL data file using slicing software, and the data file is further converted into a set of two-dimensional vectors perpendicular to the Z-axis. In other words, the vector file is utilized to determine the simulation contour of a layer of the three-dimensional model in the X-Y plane or the horizontal plane.

Figure 4A:
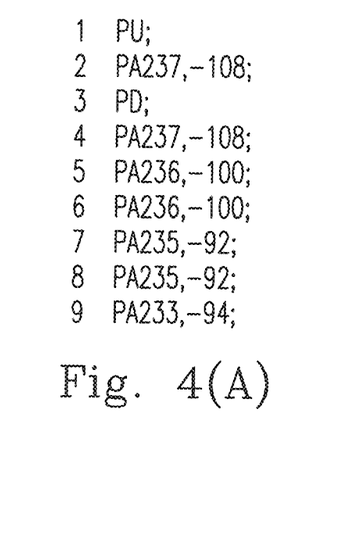
FIG. 4(A) shows an example of some data in a vector file.
Figure 4B:
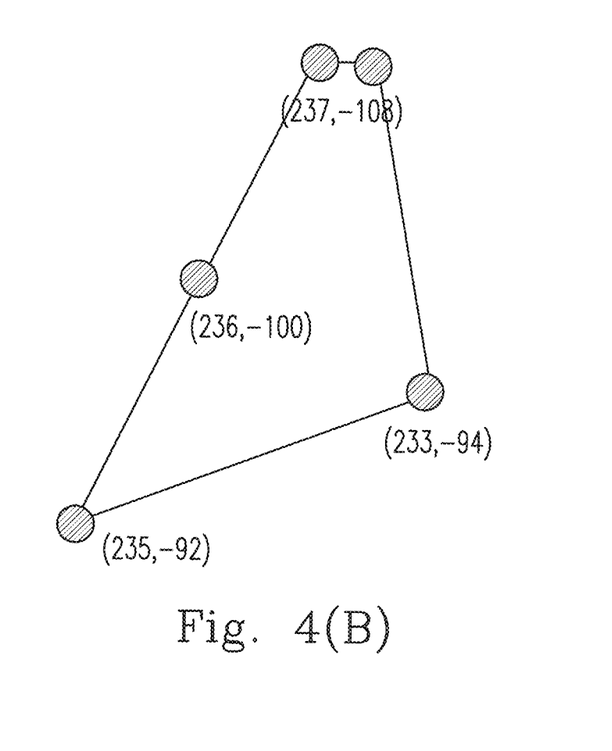
FIG. 4(B) is an schematic diagram showing a contour defined by the vector file as shown in FIG. 4(A)

Please refer to FIG. 4(B), which is a schematic diagram showing a contour defined by the vector file as shown in FIG. 4(A). According to FIG. 4(A), the HPGL text file contains pen commands (Pen Up, PU, Pen Down, PD and Plot Absolute, PA) and coordinate pairs indicating the location of points at the border of a closed contour. Vector files can be electronically provided to the photomask module 3 to generate a pattern on the LCD panel 31. According to the present invention, each of the sub-pixel elements 312R, 312g, 312B in the pixel matrix 310 is addressable, so the vector files determining the contours are preferably able to define the sub-pixel patterns to obtain the best resolution.

To make use of the LCD panel 31 as a photomask, a working pattern in which pixels inside the contour of the pattern are transparent while pixels outside the contour are opaque or blacked out can be generated by controlling each of the pixels in the pixel matrix. Having determined the location of points at the border of a closed contour, which can be obtained from the vector file, the photomask module 3 may need to distinguish the outer contour region and the inner contour region. Consequently, the photomask module 3 can electronically control the sub-pixels 312R, 312G, 312B in the pixel matrix 310 of the LCD panel 31 by flood-filling color for each of the color-filtered sub-pixels 312R, 312G, 312B to distinguish the outer contour region from the inner contour region. If all three sub-pixels in a pixel are filled with color, the pixel will be white. On the contrary, if none the three sub-pixels in a pixel is filled with color, the pixel will be black. Therefore, the sub-pixel elements 312R, 312G, 312B can be considered as light switches at different locations on the pixel matrix 310.

From a different point of view, triple resolution enhancement and edge smoothing is achieved through sub-pixel addressing. These sub-pixel components are treated as independent luminous intensity sources, and information representing the image is mapped into pixel sub-components instead of the entire pixel. Practically, we address each sub-pixel by its coordinates and color.

The Polygon Algorithm method can be adopted to distinguish whether a point is located in the inner contour region or in the outer contour region. This is done by reviewing a point potentially in the inner contour region and counting number of times a ray starting from this point crosses the polygon boundary. If a ray starting from a point hits the polygon boundary only one time, the location of the point is considered as inside the polygon. Otherwise, the point is considered as outside the polygon. The Polygon Algorithm provides a convenient means to assure that the location is either inside or outside a contour. According to one embodiment of the present invention, the photomask module 3 checks one by one whether each of the plural sub-pixels elements 312R, 312G, 312B is located inside the contour by means of the polygon algorithm. Likewise, the photomask module 3 may also check whether each of the plural sub-pixels elements 312R, 312G, 312B is located outside the contour by using the polygon algorithm.

Referring again to FIG. 3, two profiles 314, 316 respectively based on a vector file bearing a full-pixel pattern and a vector file bearing a sub-pixel pattern are illustrated in the pixel matrix 310 of the LCD display 31. Notably, two border lines 314A, 314B are shown at the boundary of the profile 314, and the border lines 316A, 316B are shown at the boundary of the profile 316. The vector images are superimposed thereon for reference. It can be observed that all of the pixel or sub-pixel elements in the inner contour region are filled with colors while the pixel or sub-pixel elements in the outer contour region are black. The skilled person in the art can also appreciate that the profile 316 constructed based on a sub-pixel pattern is much finer than the profile 314 based on a full-pixel pattern.

Figure 5A:
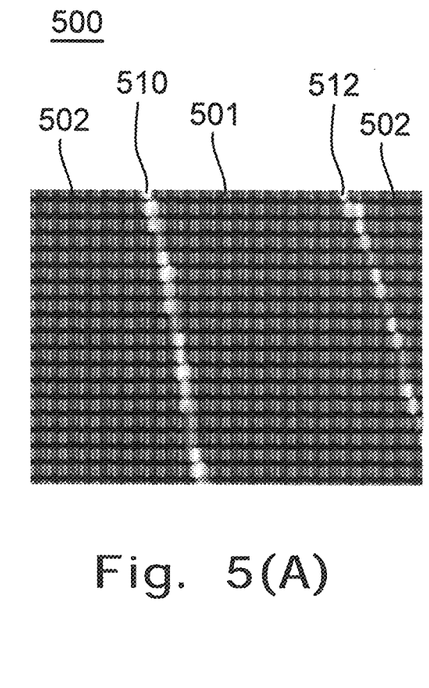
FIGS. 5(A)-5(C) are schematic diagrams showing an alternative method to adjust the color of the sub-pixels near the border according to one embodiment of the present invention.
Figure 5B:
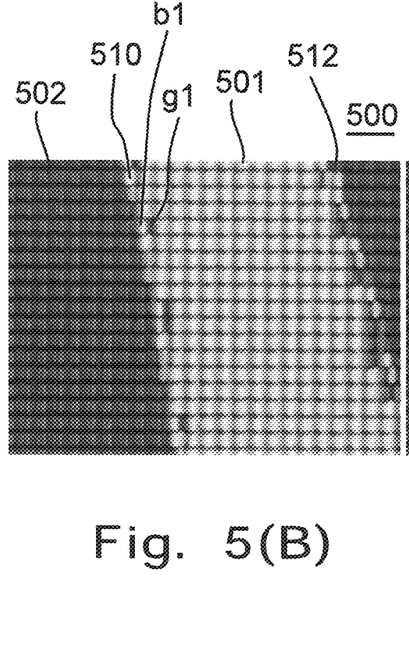
Figure 5C:
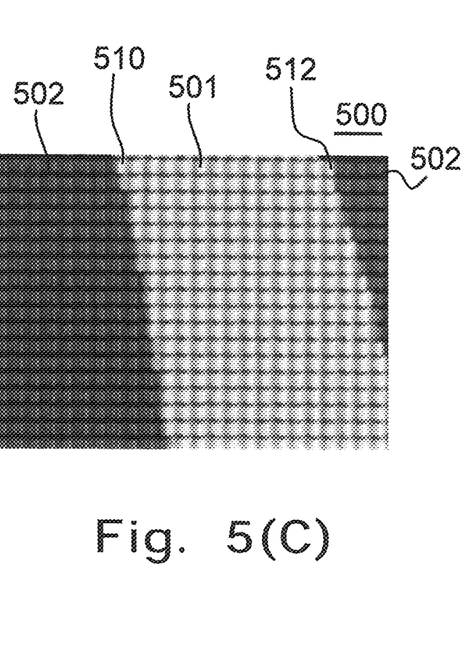

Please refer to FIGS. 5(A)-5(C), which shows an alternative method to adjust the color of the sub-pixels near the border of a contour. In FIG. 5(A), two border lines 510, 512, which are defined based on a vector file (not shown), separate a pixel matrix 500 into inner contour region 501 and outer contour region 502. In FIG. 5(B), it can be observed that almost all the sub-pixels located in the inner contour region 501 are filled with color, except some gaps such as the first gap g1 near the first border sub-pixel b1 and the second gap g2 near the second border sub-pixel b2. The aforementioned Polygon Algorithm could have a problem in determining whether a point should be located in the inner contour region or not when the point is right at the border. Thus, according to FIG. 5(B), some points inside the inner contour region 501 and near the borders 510, 512 are mistakenly calculated, and no color is filled in the sub-pixels at the corresponding locations.

The aforementioned gap issue can be resolved by applying a method based on local continuity. Taking the gap g1 as example, because the sub-pixels on both of its sides are filled with color, the sub-pixel at the same location can be adjusted to be filled with color or simply switched on. For the particular case of gap g1 which is located at a sub-pixel of green and the other sub-pixels (blue and red) located in the same square pixel area are already on, the entire square pixel area will become white when the green sub-pixel is turned on. The gap g2 is also in the same situation as g1, and therefore is filled with the color green to complete the adjustment. FIG. 5(C) shows the result after all the gaps in 5(B) are adjusted based on the method of local continuity. Likewise, any gap (not shown) in the outer contour region 502 can be also adjusted using the same method. In FIG. 5(C), it can be observed that a nearly perfect sub-pixel pattern is formed in the pixel matrix 500. It can be appreciated by the skilled person in the art that the present invention provides a method that takes advantage of cost-effective LCD panel to act as a photomask for the Vat Polymerization process with relatively fine profiles.

Again, please refer to FIG. 1. When the LCD panel 31 is used as a photomask, all the sub-pixels inside a contour 34, i.e. the inner contour region 33, are flood-filled with color while the sub-pixels in the outer contour region 35 are black. According to the illustration in FIG. 1, the lights 11, 15 are blocked by the outer contour region 35, and lights 12-14 pass the inner contour region 33 of the LCD panel 31 and pass all the way through the transparent bottom 42 of the resin vat 4. An image 43 is formed near the bottom 42 of the resin vat 4, and the photo-sensitive resin 41 is exposed to the lights 12-14 for curing. The skilled person in the art can realize that the shape of the image 43 is based on that of the contour 34.

The lens module 2 can help to focus the image 43 at a predetermined position in terms of altitude level or height. According to one preferred embodiment, the lens module 2 may include a Fresnel lens to reduce the thickness of the lens module 2. Normally, the image 43 is chosen to be at an altitude level so that the photo-sensitive resin 41 near the bottom 42 of the resin vat 4 can be exposed to the lights 12-14 and solidified to form a solid layer (not shown). The elevator 6 is also helpful for changing the altitude level of either the lens module 2 or the photomask module 3 to locate the image 43 at the proper position. When the photomask module 3 is disposed on the X-Y plane, the elevator 6 can move any of the devices including the lens module 2, the photomask module 3, the resin vat 4 and the modeling panel 5 along the Z-axis.

After a solid layer is formed, the contour 34 on the LCD panel 31 can be replaced electronically by inputting another vector file bearing a different pattern, and the VPP production can be repeated once again to fabricate an additional layer formed of solidified light-sensitive resin 41. Using the layer-after-layer VPP fabrication, a three dimensional (3D) object based on a model, either a life-sized object or a computer-assisted-design (CAD) model, can be efficiently produced based on the method according to the present invention. The present invention helps to improve the efficiency of VPP fabrication due to its fast pace in changing photomask patterns, and also provides the VPP fabrication with more cost effective photomask solutions with higher resolution.

Embodiments

1. A method of curing a photosensitive resin, comprising steps of: (a) generating a sub-pixel pattern having an outer contour region and an inner contour region based on a vector file taken from a cross-section of a model; (b) providing the sub-pixel pattern to a photomask module, wherein the photomask module includes a panel having a pixel matrix including plural square pixels, each of which includes three color-filtered sub-pixels; (c) flood-filling color in each of the color-filtered sub-pixels to distinguish the outer contour region from the inner contour region; and (d) exposing the photo-sensitive resin to a light source emitting a light passing through the panel.
2. The method of Embodiment 1, further comprising a step of providing an optical lens between the light source and the panel to focus an image of the inner contour region.
3. The method of Embodiment 2, wherein the optical lens is a Fresnel lens.
4. A stereolithography method for fabricating an article based on a cross-section of a model, comprising steps of: providing a liquid crystal display photomask module (LCDLMM) having a pixel matrix including plural square pixels, each of which includes three addressable sub-pixels; inputting a contour, simulating the cross-section, into the LCDLMM; determining all the addressable sub-pixels inside the contour; flood-filling color in each of the addressable sub-pixels inside the contour; and forming the article based on the pixel matrix.
5. The method of Embodiment 4, wherein the article is formed by exposing a photo-sensitive resin to a light source emitting a light passing through the pixel matrix.
6. The method of Embodiment 4, further comprising steps of: designing a three-dimensional CAD model according to the model; transforming the three dimensional CAD model into a data file; and converting the three-dimensional CAD model into a file having a set of two-dimensional vectors perpendicular to a Z-axis.

7. The method of Embodiment 6, wherein the steps of designing the three-dimensional CAD model, transforming the three dimensional CAD model and converting the three-dimensional model are performed prior to the step of providing the LCDLMM.

8. The method of Embodiments 6 or 7, wherein the data file is a tessellated STL data file.

9. The method of Embodiments 6-8, wherein the step of converting the three-dimensional model is implemented by using slicing software.

10. A stereolithography method for fabricating a layer based on a cross-section of a candidate object, comprising the steps of: providing a transparent mask module having a sub-pixel matrix including plural addressable sub-pixels elements; designing a contour, simulating the cross-section into the sub-pixel matrix; checking one by one whether each of the plural sub-pixels elements is located inside the contour; flood-filling color in each of the sub-pixels inside the contour; and forming the layer based on the sub-pixel matrix.

11. The method of Embodiment 10, wherein the candidate object is life-sized.

12. The method of any of the abovementioned Embodiments, wherein the color-filtered sub-pixels are addressable units.

13. The method of any of the abovementioned Embodiments, wherein the vector file is in the Hewlett-Packard Graphical Language.

14. The method of any of the abovementioned Embodiments, further comprising a step of applying a polygon algorithm to adjust the outer contour region and the inner contour region.

15. The method of any of the abovementioned Embodiments, wherein the photosensitive resin has an absorption spectrum in the visible light region.

16. The method any of the abovementioned Embodiments, wherein the light source is a point light source, a linear light source, a planar light source, a halogen lamp or a combination thereof 17. The method of any of the abovementioned Embodiments, wherein the step of checking one by one or determining whether each of the plural sub-pixel elements is located inside the contour is determined by a polygon algorithm.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims, which are to be accorded with the broadest interpretation so as to encompass all such modifications and similar structures.

What is claimed is:

1. A method of curing a photosensitive resin, comprising steps of:
generating a sub-pixel pattern having an outer contour region and an inner contour region based on a vector file taken from a cross-section of a model;
providing the sub-pixel pattern to a photomask module, wherein the photomask module includes a panel having a pixel matrix including plural square pixels, each of which includes three color-filtered sub-pixels;
flood-filling color in each of the color-filtered sub-pixels to distinguish the outer contour region from the inner contour region; and
exposing the photo-sensitive resin to a light source emitting a light passing through the panel.

2. The method according to claim 1, wherein the color-filtered sub-pixels are addressable units.

3. The method according to claim 1, wherein the vector file is in Hewlett-Packard Graphical Language.

4. The method according to claim 1, further comprising a step of:
applying a polygon algorithm to adjust the outer contour region and the inner contour region.

5. The method according to claim 1, wherein the photosensitive resin has an absorption spectrum in the visible light region.

6. The method according to claim 1, wherein the light source is one selected from a group consisting of a point light source, a linear light source, a planar light source and a combination thereof.

7. The method according to claim 1, wherein the light source is a halogen lamp.

8. The method according to claim 1, further comprising a step of:
providing an optical lens between the light source and the panel to focus an image of the inner contour region.

9. The method according to claim 8, wherein the optical lens is a Fresnel lens.

10. A stereolithography method for fabricating an article based on a cross-section of a model, comprising steps of:
providing a liquid crystal display photomask module (LCDLMM) having a pixel matrix including plural square pixels, each of which includes three addressable sub-pixels;
inputting a contour, simulating the cross-section, into the LCDLMM;
determining all the addressable sub-pixels inside the contour;
flood-filling color in each of the addressable sub-pixels inside the contour; and
forming the article based on the pixel matrix.

11. The method according to claim 10, wherein the article is formed by exposing a photo-sensitive resin to a light source emitting a light passing through the pixel matrix.

12. The method according to claim 11, wherein the light source is one selected from a group consisting of a point light source, a linear light source, a planar light source and a combination thereof.

13. The method according to claim 11, wherein the light source is a halogen lamp.

14. The method according to claim 10, further comprising steps of:
designing a three-dimensional CAD model according to the model;
transforming the three-dimensional CAD model into a data file; and
converting the three-dimensional CAD model into a file having a set of two-dimensional vectors perpendicular to a Z-axis.

15. The method according to claim 14, wherein the steps of designing the three-dimensional CAD model, transforming the three-dimensional CAD model and converting the three-dimensional model are performed prior to the step of providing the LCDLMM.

16. The method according to claim 14, wherein the data file is a tessellated STL data file.

17. The method according to claim 14, wherein the step of converting the three-dimensional model is implemented by using slicing software.

18. A stereolithography method for fabricating a layer based on a cross-section of a candidate object, comprising the steps of:
    providing a transparent mask module having a sub-pixel matrix including plural addressable sub-pixels elements;
    designing a contour, simulating the cross-section, into the sub-pixel matrix;
    checking one by one whether each of the plural sub-pixels elements is located inside the contour;
    flood-filling color in each of the sub-pixels inside the contour; and
    forming the layer based on the sub-pixel matrix.

19. The method according to claim 18, wherein the candidate object is life sized.

20. The method according to claim 18, wherein the step of checking one by one whether each of the plural sub-pixels elements is located inside the contour is determined by a polygon algorithm.

\* \* \* \* \*